United States Patent

Hisano et al.

[11] Patent Number: 6,040,043
[45] Date of Patent: Mar. 21, 2000

[54] PARTICLES FOR LOWER LAYER OF COATING TYPE MAGNETIC RECORDING MEDIUM

[75] Inventors: Seiichi Hisano, Chiba; Kazuhisa Saito, Okayama; Kazushi Sano, Okayama; Shinichi Konno, Okayama; Yoshichika Horikawa, Okayama; Yasuhiko Aihara, Okayama, all of Japan

[73] Assignee: Dowa Mining Co., Ltd., Tokyo, Japan

[21] Appl. No.: 08/952,438

[22] PCT Filed: Mar. 21, 1997

[86] PCT No.: PCT/JP97/00927

§ 371 Date: Nov. 20, 1997

§ 102(e) Date: Nov. 20, 1997

[87] PCT Pub. No.: WO97/34830

PCT Pub. Date: Sep. 25, 1997

[30] Foreign Application Priority Data

Mar. 21, 1996 [JP] Japan .................................. 8-89976
Aug. 5, 1996 [JP] Japan .................................. 8-220746

[51] Int. Cl.[7] .................................................. G11B 5/68
[52] U.S. Cl. .......................... 428/323; 428/328; 428/329; 428/331; 428/694 BS; 428/694 BN; 428/900
[58] Field of Search ................................. 428/323, 328, 428/329, 331, 694 BS, 694 BN, 900

[56] References Cited

U.S. PATENT DOCUMENTS

| 5,503,911 | 4/1996 | Aoki et al. ............................. 428/213 |
| 5,587,232 | 12/1996 | Hayashi et al. ........................ 428/323 |
| 5,686,378 | 11/1997 | Katamoto ............................... 502/338 |

FOREIGN PATENT DOCUMENTS

| 582 472 | 8/1993 | European Pat. Off. . |
| 4-167225 | 6/1992 | Japan . |
| 5-262528 | 10/1993 | Japan . |
| 6-60362 | 3/1994 | Japan . |
| 6-263449 | 9/1994 | Japan . |

*Primary Examiner*—Stevan A. Resan
*Attorney, Agent, or Firm*—McDermott, Will & Emery

[57] ABSTRACT

Iron oxyhydroxide particles that are composed of acicular particles having an average major axis of 0.01 to 0.5 μm and containing not less than 0.1 wt. % and not more than 30 wt. % of Al in the iron oxyhydroxide and that release not less than 0.1 wt. % and not more than 2 wt. % of $H_2O$ at 100° C. are used as particles of a lower layer of a coating type magnetic recording medium having a multi-layer structure. The acicular particles include ones having two or more branches whose branching direction is skewed toward a two-dimensional orientation.

5 Claims, 2 Drawing Sheets

PARTICLES FOR LOWER LAYER OF COATING TYPE MAGNETIC RECORDING MEDIUM

TECHNICAL FIELD

This invention relates to particles for use in a lower layer of a coating type magnetic recording medium having a multi-layer structure.

BACKGROUND ART

In magnetic tapes, magnetic disks and other coating-type magnetic recording media composed of a magnetic layer formed on a non-magnetic substrate, which usually consists of resinous film, by coating the substrate with a coating film of magnetic particles dispersed in a resinous binder, it is desirable for the magnetic layer to have a small thickness so as to obtain low-noise, high-output characteristics. To accomplish this, there have been proposed coating-type magnetic recording media with a multi-layer structure, which are formed between the magnetic layer and the substrate with a non-magnetic coating layer (referred to as "lower layer" in this specification) obtained by dispersing non-magnetic particles in a resinous binder.

Spherical particles of titanium oxide and iron oxide particles have so far been proposed as non-magnetic particles for use in forming the lower layer. JPA-6-215360, for instance, describes property values obtained when acicular hematite ($\alpha$-$Fe_2O_3$), spherical hematite ($\alpha$-$Fe_2O_3$), Co-$\gamma$-$Fe_2O_3$, acicular $TiO_2$ and spherical $TiO_2$ are used as the non-magnetic particles of the lower layer of a multi-layer structure magnetic recording media. Likewise, JPA-6-139553, JPA-7-282443, JPA-7-326037 and JPA-7-334835 describe property values obtained when acicular $\alpha$-$Fe_2O_3$ is used as the non-magnetic particles of the lower layer. Similarly, JPA-7-78331, JPA-7-105530 and JPA-7-182649 describe property values obtained when Co-$\gamma$-$Fe_2O_3$ is mainly used, and also when $\alpha$-$Fe_2O_3$ is used, as the non-magnetic particles of the lower layer. In addition to the foregoing iron oxide particles for which specific property values are indicated, these publications also list the names of numerous other substances as being usable as the non-magnetic particles of the lower layer. Iron oxyhydroxide is included among these.

On the other hand, JPA-4-167225 teaches a multi-layer structure distinctive in that the thickness of the non-magnetic lower layer is thinner than the thickness of the upper magnetic layer, and appraises the scratching property, stiffness and head contact properties of tapes using iron oxyhydroxide particles to form the non-magnetic lower layer. JPA-6-60362, however, recommends use of acicular $\alpha$-$Fe_2O_3$, stating that iron oxyhydroxide is impossible to use as the particles of the lower layer because of its poor dispersibility in binder.

OBJECT OF THE INVENTION

Use of iron oxyhydroxide as lower layer particles has never actually been achieved with respect to a magnetic recording medium having a multi-layer structure. None of the aforesaid publications other than JPA-4-167225 describe specific examples of using iron oxyhydroxide (FeOOH) as lower layer particles. Actual use of iron oxyhydroxide in the manner of JPA-4-167225 has generally been considered to be impossible because of its poor dispersibility in binder, as taught by JPA-6-60362.

As such, there are still many unknowns concerning which type of iron oxyhydroxide will exhibit the intended functions when used as the particles of the lower layer of a magnetic recording medium. FeOOH is usually produced by oxidizing a suspension of $Fe(OH)_2$, but it is well known that even slight variation in oxidizing conditions can result in different phases, and differences in properties and morphology. Clearly, therefore, not all known iron oxyhydroxides have the right properties for use as lower layer particles.

This invention is related to the application of iron oxyhydroxide particles as lower layer particles and is directed to clarifying how the chemical/physical properties and shape characteristics of these particles affect the surface smoothness, strength, magnetic properties and weatherability of the magnetic recording medium, and to contributing to improvement of the properties of multi-layer structure magnetic recording media through application of iron oxyhydroxide particles as lower layer particles.

DISCLOSURE OF THE INVENTION

As particles of a lower layer of a coating type magnetic recording medium having a multi-layer structure, the present invention uses iron oxyhydroxide particles that are composed of acicular particles having an average major axis of 0.01 to 0.5 $\mu$m and containing not less than 0.1 wt. % and not more than 30 wt. % of Al in the iron oxyhydroxide and that release not less than 0.1 wt. % and not more than 2 wt. % of $H_2O$ at 100° C. As particles of a lower layer of a coating type magnetic recording medium having a multi-layer structure, the present invention also uses iron oxyhydroxide particles that are composed of acicular particles having an average major axis of 0.01 to 0.5 $\mu$m and containing not less than 0.1 wt. % and not more than 30 wt. % of Si in the iron oxyhydroxide and that release not less than 0.1 wt. % and not more than 2 wt. % of $H_2O$ at 100° C. Particles containing Al and Si in combination can also be used. In this case, particles containing a total amount of Al and Si in the range of not less than 0.1 wt. % and not more than 30 wt. % are used. "Multi-layer structure" as termed here means a laminated structure comprising a non-magnetic substrate film, a non-magnetic layer of non-magnetic particles dispersed in a resinous binder formed on the substrate film, and a magnetic layer of magnetic particles dispersed in a resinous binder formed on the non-magnetic. "Lower layer" refers to the non-magnetic layer.

Those of the acicular particles according to this invention having two or more branches have their branching direction skewed toward a two-dimensional orientation so as to fall in a single plane.

When the acicular particles according the invention contain Al, the Al is preferably occluded within the acicular particles.

When the non-magnetic layer (lower layer) of the coating-type magnetic recording medium of multi-layer structure is constituted using the acicular particles according to the invention, a magnetic layer of small thickness and having no bumpiness can be uniformly formed thereon and the magnetic properties of the magnetic recording medium can be markedly improved.

BEST MODE FOR CARRYING OUT THE INVENTION

The aim of specially providing a non-magnetic (lower layer) of a dispersion of non-magnetic particles dispersed in a resinous binder between the non-magnetic substrate film and the magnetic layer of magnetic particles dispersed in a resinous binder is fundamentally to reduce the thickness of the magnetic layer so as to secure output in the short-wavelength recording region and to obtain excellent electromagnetic conversion characteristics such as improved erase characteristics and/or overwrite characteristics. While to achieve this the magnetic layer itself must have appropriate properties, the non-magnetic lower layer manifests certain functions, the main ones of which can be listed as: to enable a smooth, thin magnetic layer with few surface irregularities to be coated thereon, i.e., the surface smoothness of the non-magnetic layer itself is excellent, to impart strength to the magnetic recording medium, and to thoroughly bring out the magnetic properties of the upper magnetic layer.

With the spherical particles of titanium oxide that have been used as lower layer particles, the strength when tape is formed is insufficient compared with that in the case of acicular particles and, moreover, reduction of particle size is difficult. In the case of acicular iron oxide (hematite), with the production method used it is impossible to avoid sintering of the particles, giving rise to an attendant problem of not being able to secure sufficient surface smoothness.

When a coating film is formed of iron oxyhydroxide dispersed in binder resin, the surface smoothness, strength and the like may be affected to some degree by the binder resin, depending on the type used, but are greatly affected by the physical and chemical properties of the iron oxyhydroxide as well as by the dimensions and shape of its particles. In this specification, iron oxyhydroxide (or iron (III) hydroxide) refers to a compound represented by the general formula FeOOH. While it is commonly referred to as "geothite," the iron oxyhydroxide in this invention is not a natural ore but is produced artificially.

It was found that the iron oxyhydroxide particles for the lower layer that best enable the lower layer to excellently fulfill its functions of improving surface smoothness, strength and magnetic layer characteristics are iron oxyhydroxide particles that are composed of acicular particles having an average major axis of 0.01 to 0.5 $\mu$m and containing not less than 0.1 wt. % and not more than 30 wt. % of Al in the iron oxyhydroxide and that release not less than 0.1 wt. % and not more than 2 wt. % of $H_2O$ at 100° C.

It was also found that particles the same as the aforementioned ones except that instead of containing Al they contain Si within the aforesaid range or contain Al and Si in a total amount within the aforesaid range manifest similar functions.

It was further found that the lower layer is enabled to manifest its aforesaid important functions more effectively by acicular particles of the present invention having two or more branches whose branching direction is skewed toward a two-dimensional orientation.

It was further found that the lower layer is enabled to manifest its aforesaid important functions more effectively by acicular particles of the present invention having an atmospheric decomposition temperature of 210° C. or higher, preferably 215° C. or higher.

In addition to the above properties, it is also desirable for the iron oxyhydroxide particles of the present invention to have the following properties.

A specific surface area measured by the BET method that is within the range of 10 to 300 $m^2/g$, preferably 40 $m^2/g$ or more and more preferably 40 to 150 $m^2/g$. A TAP density of 0.3 to 1.5 $g/cm^3$, preferably not less than 0.40 $g/cm^3$ and not more than 1.2 $g/cm^3$. A compression density of 0.5 to 3.0 $g/cm^3$, preferably 1.0 to 2.0 $g/cm^3$. A true specific gravity preferably of 3.0 to 6.0 $g/cm^3$, more preferably 3.5 to 4.3 $g/cm^3$. The high compression density and TAP density relative to the true specific gravity enables the particles to be dispersed in the binder at a high charging rate and facilitates compression of the particles in the coating film during application of this coating material on the substrate film (calendering), which advantageously works to improve the surface smoothness of the tape.

<Crystalline diameter> (Crystallite) is 10 to 200 angstrom, preferably 50 to 150 angstrom.

In size, the particles have an average major axis of 0.01 to 0.5 $\mu$m, an average minor axis of 0.01 to 0.05 $\mu$m, and an average aspect ratio of greater than 1 to 30, preferably 3 to 30. The crystalline diameter within the particles is 10 to 200 Å, preferably 50 to 150 Å. The fineness of these particles and the small length of the average minor axis, particularly the axis of shortest length (smallest short axis), advantageously works to improve the surface smoothness of the tape. The average minor axis is reflected in the values of the aforesaid crystalline diameter and the specific surface area.

The surface treatment condition and pH of the particles of the present invention also have an influence on the dispersibility when forming the coating material, and therefore also affect the surface smoothness. In light of this, as indicated in the Working Examples set out later, it is desirable to establish a surface treatment condition of an amount of stearic acid adsorption on the particles in the range of 0.1 to 3.0 $mg/m^2$ and an amount of resin adsorption on the particles in the range of 0.5 to 4.0 $mg/m^2$ and to adjust the particle pH to 6 to 11, preferably 8 to 10, more preferably 8.0 to 9.5. The adjustment of the pH value is particularly important; by it the dispersibility when forming the coating material is enhanced, which advantageously works to improve the surface smoothness.

The particles for the lower layer according to this invention can be obtained by the method generally used to produce iron oxyhydroxide. One such process comprises, for example, producing the particles by oxidizing a suspension containing colloidal ferrous hydroxide particles and having a pH of not less than 11, which is obtained by adding not less than an equivalent of an aqueous alkali hydroxide solution to an aqueous ferrous salt solution, by passing an oxygen-containing gas thereinto at a temperature not higher than 80° C., followed by drying and water content adjustment, while another such process comprises producing the particles by oxidizing a suspension obtained by reacting an aqueous ferrous salt solution with an aqueous alkali carbonate solution, by passing an oxygen-containing gas thereinto, followed by drying and water content adjustment. Unlike in the production of acicular iron oxide (hematite) particles, iron oxyhydroxide particles obtained by such a method are not subjected to a high-temperature treatment step, so a problem of particle sintering together does not arise.

Figure 1:
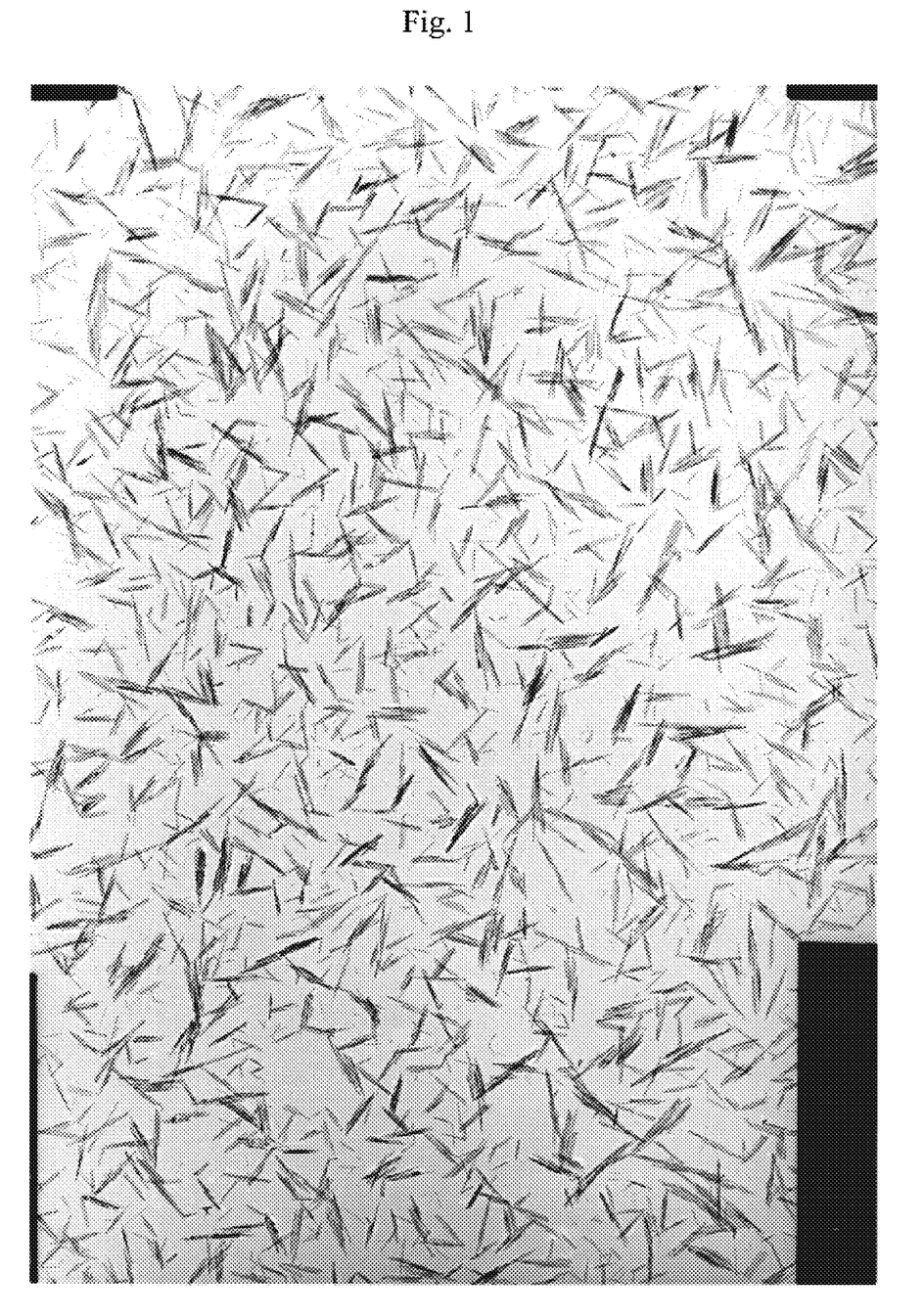
FIG. 1 is an electron microphotograph showing the shapes (branching) of individual lower layer particles composed of the acicular iron oxyhydroxide according to the invention.

FIG. 1 is a TEM (transmission electron microphotograph) of iron oxyhydroxide particles according to the present invention, with a major axis of 0.30 $\mu$m, Al content of 2.8 wt. %, and a specific surface area of 65 $m^2/g$ as measured by the BET method. As revealed by FIG. 1, the branching direction of the branched particles is skewed toward a plane parallel to the drawing sheet. This can be seen from the fact that even when a particle has two or more two branches, their branching angles appear substantially uniform. If most of the components were normal to the plane of the drawing sheet, the branching angles would appear to be sharper. In FIG. 1, the particles having two or more branches all have substantially a constant branching angle and only two particles in 30 appear to have branches deviating from this angle. From this it can be estimated that among particles having two or more branches the probability of the particle having its branching angles in a single plane is 93%.

Defining the percentage of particles thus estimated to have branches forking in a single plane (only particles having two or more branches) as the skew rate toward two-dimensional orientation, the two-dimensional skew rate of the particles for the lower layer according to this invention is preferably 70% or higher, more preferably 80% or higher, still more preferably 90% or higher.

The fact that the branching direction of the branches is skewed toward two dimensional orientation in a specific plane even with respect to particles that have a plurality of branches contributes to the surface smoothness of the lower layer in which particles are used. This is because when the coating is applied, there are few branch components perpendicular to the substrate plane and the particles are densely compacted. Moreover, when the branched acicular particles are compacted, the branches mutually interlock to enhance the strength of the tape. In this case, when the major axis is not more than 0.5 μm, the fine iron oxyhydroxide acicular particles are characterized by having a high acicular ratio resulting from the very fine minor axis diameter, as can also be seen in FIG. 1, so that the orientation in the longitudinal direction of the tape during the coating is good (the branches also being oriented in this direction), thereby improving the strength of the tape as well as the surface smoothness.

Providing the iron oxyhydroxide with a suitable Al content improves the heat resistance and can-stability of the particles. An Al content of 0.1 to 30 wt. % suffices. When a coating material containing such particles is used, the particles can be stably maintained without change from their state at the time of coating even when the material temperature is elevated during the drying step and calendering step of tape formation. This effect of Al inclusion is insufficient when the Al content is less than 0.1 wt. %. An Al content that exceeds 30 wt. % increases the specific surface area of the particles, degrading the dispersibility in the resinous binder. When Al is contained as a compound, the Al content as termed herein refers not to the content of the compound but to the content of elemental Al.

The Al can be contained either in a state of being occluded within particles (in what can be called a type of solid solution state) or in a state of being clad on the particle surfaces (in a state with the Al compound in contact with the particle surfaces). As indicated by the test examples described later, however, the decomposition temperature of the iron oxyhydroxide was found to be higher in the former case than in the latter. A high decomposition temperature of the particles provides the advantageous effect of making it possible to avoid foaming during calendering. The coating film temperature ordinarily reaches 50 to 150° C. in the calendering step during magnetic tape production but, depending on the conditions, may reach higher temperatures, even if only momentarily. If the iron oxyhydroxide decomposes at such times, foaming occurs in the coating film, making the surface of the lower layer bumpy and, in turn, the surface of the magnetic layer bumpy, so that the magnetic tape with foaming becomes a reject. The iron oxyhydroxide particles of the present invention are therefore suitable as the particles of the lower layer of a magnetic tape from the point of avoiding the risk of foaming during calendering.

Table 1 shows the Al contents and decomposition starting temperatures of typical particles shown in Table 2 for the Working Examples set out later. The relationships of Table 1 are plotted in FIG. 2. The decomposition temperatures were measured using a differential thermal analyzer in compliance with JIS K7120.

TABLE 1

| Al content (wt. %) | Decomposition starting temperature ° C. | Form of Al inclusion |
| --- | --- | --- |
| 0 | 190 | — |
| 1 | 250 | Occluded within particles |
| 2.5 | 260 | Occluded within particles |
| 5 | 270 | Occluded within particles |
| 2.5 | 235 | Clad on particle surface |

Figure 2:
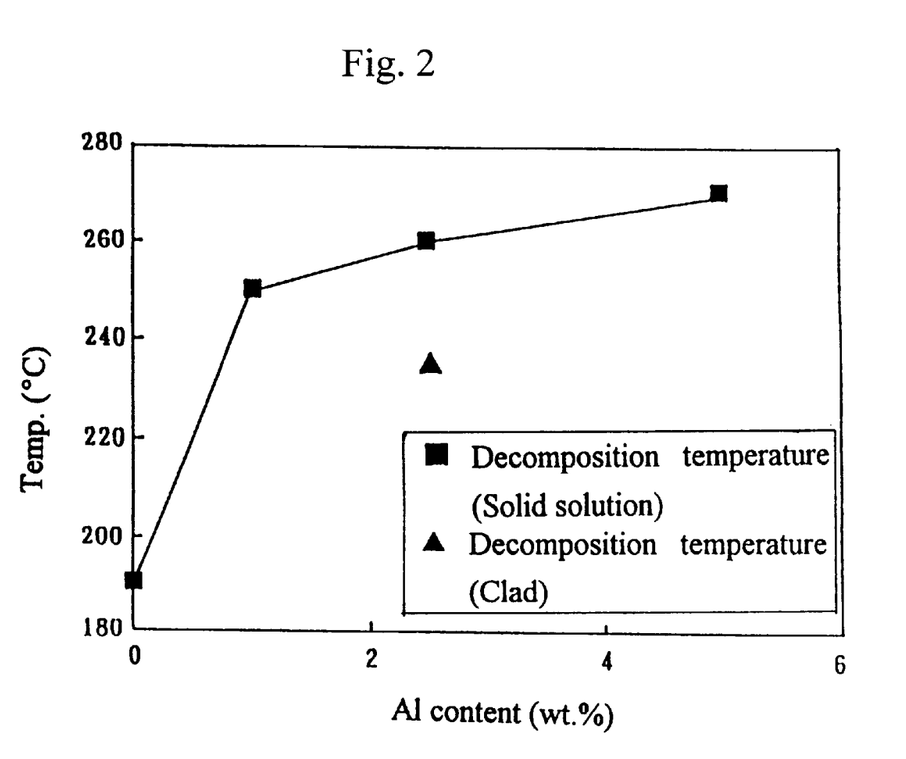
FIG. 2 is graph showing the relationship between Al content of iron oxyhydroxide and the decomposition temperature of the iron oxyhydroxide.

As can be seen from FIG. 2 and Table 1, the decomposition starting temperature of the iron oxyhydroxide particles increases with increasing Al content. Between particles having the same Al content, the decomposition starting temperature is higher for particles having the Al occluded therein than for particles having the Al clad on the surface thereof.

The Al can be contained in the iron oxyhydroxide particles in the form of a water-soluble salt such as $Al_2(SO_4)_3$, $Al(NO_3)_3$ and $AlCl_3$, a water-soluble aluminate such as $NaAlO_2$ (sodium aluminate), or other such compound. These Al compounds can be used to clad the surface of the iron oxyhydroxide particles with Al by, for example, dissolving the Al compound in an alkaline solution, dispersing the iron oxyhydroxide in the solution, neutralizing the solution by blowing carbon dioxide gas into the solution or by adding an acid, thereby cladding the surface of the particles with Al in the form of crystalline or amorphous $Al_2O_3 \cdot nH_2O$ (aluminum hydroxide). On the other hand, the Al can be occluded within the iron oxyhydroxide particles by adding the water-soluble Al salt or aluminate when α-FEOOH, γ-FeOOH or the like is formed by utilizing a neutralizer such as $NaOH$, $Na_2CO_3$, or $NH_4OH$ to neutraliie an aqueous ferrous salt solution of $FeSO_4$, $FeCl_2$ or the like, and then oxidizing the solution with air, for example.

The surface quality of the particles according to the present invention may also be controlled by using other elements such as a Si compound. The content range in the case of Si is 0.1 to 30 wt. %. When Al and Si are both used, the combined total content should be within the range 0.1 to 30 wt. %. The Si can be included in the iron oxyhydroxide particles by, for example, the method of adding to a suspension containing α-FeOOH an aqueous solution containing Si, e.g., sodium silicate or potassium silicate, an aqueous suspension containing Si such as a colloidal silica suspension, or No.3 waterglass, and adjusting the pH to 9 or lower. When Si is contained as a compound, the Si content as termed herein refers not to the content of the compound but to the content of elemental Si.

The amount of $H_2O$ that the particles of the invention used for the lower layer release at 100° C. is required to be not less than 0.1 wt. % and not more than 2 wt. %. By water released at 100° C. is meant the total amount of water released when the particles are maintained at 100° C. under atmospheric pressure, which in other words means that they contain an appropriate amount of water, but not an excessive amount of water, in the normal temperature state during blending with the resinous binder. The amount of water released at 100° C. can be measured using the moisture measurement principle according to Karl Fischer's method.

It was found that when the amount of water released by the particles at 100° C. is less than 0.1 wt. %, the particles do not disperse well when blended with the resinous binder, so that density differences arise in the coating material and make it difficult to form a non-magnetic lower layer of even thickness. On the other hand, when the amount of water released at 100° C. exceeds 2 wt. %, the dispersion is good at some portions and poor at others. This also gives rise to density differences in the coating material and similarly makes it difficult to form a non-magnetic lower layer of even thickness. When it exceeds 3 wt. %, tape formation becomes impossible.

Particles whose amount of released water at 100° C. is 0.1 to 2 wt. % can be obtained by the following processing procedure. Specifically, adjustment to the desired amount of water release is possible by the method of drying the cake obtained by filtration and washing at the final stage of particle production at a prescribed temperature, passing steam through the cake as entrained by a carrier gas such as nitrogen gas or dry air at a prescribed concentration and a fixed temperature, and maintaining the contact therewith for a prescribed time period.

When the iron oxyhydroxide particles according to the present invention are used to form the lower layer of a multi-layer structure magnetic recording medium, the magnetic upper layer can be formed thereon to have a small thickness of, for example, 0.05 to 1.0 μm and to have a smooth surface and uniform thickness. As the magnetic particles and the resinous binder for forming the magnetic upper layer, there can be used those known heretofore. Preferable magnetic particles include the ferromagnetic metal particles having an average major axis of 0.01 to 0.4 μm and an aspect ratio of 3 to 15 developed by the inventors, which are composed of acicular particles of Fe containing:

Co: 5 to 50 at. %
Al: 0.1 to 30 at. %
Rare earth elements (including Y): 0.1 to 10 at. %,
Periodic table group 1a elements: not more than 0.05 wt. %,
Periodic table group 2a elements: not more than 0.1 wt. % (including 0 wt. %).

Examples of the periodic table group 1a elements here include Li, Na, and K, whose total content is set at not more than 0.05 wt. % even when used in combination. Examples of the periodic table group 2a elements include Mg, Ca, Sr, and Ba, whose total content is set at not more than 0.1 wt. % even when used in combination. The rare earth elements include Y, La, Ce, Pr, Nd, Sm, Tb, Dy, and Gd, whose total amount is set at 0.1 to 10 at. %. When these elements are contained as compounds, the content as termed herein refers not to the content of the compound but to the content of the element.

The metal particles have a specific surface area by the BET method of 30 to 70 m$^2$/g, a crystalline diameter of 50 to 250 Å, a coercive force Hc of 1200 to 3000 (Oe) and a saturation magnetic flux density as of 100 to 200 (emu/g).

The size of the metal particles is suitably 0.01 to 0.4 μm, preferably 0.4 to 0.2 μm. At less than 0.01 μm., the magnetic particles become superparamagnetic, which markedly degrades the electromagnetic conversion characteristics, while at greater than 0.4 μm, the metal particles have multiple magnetic domains, which degrades the electromagnetic conversion characteristics. The specific surface area (BET) thereof is suitably 30 to 70 m$^2$/g, preferably 40 to 60 m$^2$/g. At less than 30 m$^2$/g, the compatibility with the resin during tape formation becomes poor, degrading the electromagnetic conversion characteristics, while at greater than 70 m$^2$/g, poor dispersion arises during tape formation, which also degrades the electromagnetic conversion characteristics. The particle crystallite (crystalline diameter) is suitably 50 to 250 Å, preferably 100 to 200 Å. At smaller than 50 Å, the magnetic particles become superparamagnetic, markedly lowering the electromagnetic conversion characteristics, while at larger than 250 Å, noise increases and degrades the electromagnetic conversion characteristics. The higher the coercive force Hc is, the more suitable it is for high-density recording. However, it can be controlled to 1200 to 3000 (Oe), preferably 1600 to 2600 (Oe), in line with the capacity of the magnetic head. The higher the saturation magnetic flux density as is, the higher the output becomes, but to achieve a balance with oxidation resistance, noise and the like, about 120 to 180 emu/g is preferable.

The substrate film coated with the non-magnetic lower layer and the magnetic upper layer to form the multi-layer magnetic recording medium may be a known film of a polyester such as polyethylene terephthalate, polyethylene Inaphthalate, a polyolefin, cellulose triacetate, polycarbonate, polyamide, polyimide, polyamide-imide, polysulfone aramide, or aromatic polyamide.

EXAMPLES

Working Example 1

To 10 liters of an aqueous solution of FeSO$_4$ of a concentration of 0.2 mol/L (molaliter) were added 1 liter of an 8 mol/L aqueous solution NaOH and an amount of NaAlO$_3$ affording an Al/Fe atomic ratio of 0.016, whereafter air was blown into the solution for 5 hr while holding it at 30° C. The resulting precipitate was subjected to solid-liquid separation and the particles obtained were washed and dried. The dried particle cake was held for 30 min in a stream of 60° C. gas composed of nitrogen gas containing 2 vol. % of steam. X-ray diffraction and analysis showed the particles to consist of α-FeOOH occluding 1.0 wt. % of Al therein. The coprecipitation rate of Al in the air-oxidation step was confined to be 99% or higher. The amount of water released by the particles at 100° C. was substantially 1 wt. %.

The values for the different properties of the particles obtained are shown in Table 2. The values of the properties shown in Table 2 were measured as follows.

The average major axis (denoted by I in the Tables), average minor axis (denoted by d), and aspect ratio (denoted by I/d) are average values obtained from measuring 100 particles in electron microphotographs of 108,000 magnifications. The branching state was simultaneously observed and the skew rate (%) toward two-dimensional orientation of particles having two or more branches was estimated by the method explained earlier with reference to FIG. 1.

The crystalline diameter or crystallite (denoted by Dx) was calculated by obtaining the peak half width corresponding to the (110) plane from a profile obtained with an x-ray diffraction apparatus, and substituting this into a Scherrer formula.

The specific surface area (denoted by BET) was measured using the BET method. As is well known, the BET method degasses the particles by heat treatment at around 105° C., adsorbs nitrogen gas on the particles at the temperature of liquid nitrogen and calculates the specific surface area using a prescribed BET adsorption isotherm to express it as square meters of surface area per gram.

The stearic acid adsorption amount (denoted by STA or St. adsorption amount) was calculated as the adsorption amount per specific surface area obtained by dispersing sample particles in a 2% MEK (methyl ethyl ketone) solution of stearic acid, centrifuging the solution to cause the particles to settle and measuring the concentration of the supernatant.

The amount of resin adsorption (denoted by Resin) was calculated by the same method as for the stearic acid adsorption amount, using a 2% MIBK (methyl isobutyl ketone) solution of polyurethane resin.

The pH of the particles was measured according to JIS K5101. The true specific gravity was measured by the immersion method, using toluene as the solvent. The compression density (denoted by CD) is the density of the sample compressed at a pressure of 80 kgf/cm$^2$. The TAP density (denoted by TAP) was measured according to JIS K5101.

The water content of the particles was calculated from change in weight at 100° C. in accordance with Karl Fischer's method. The result showed the amount of water released by the particles at 100° C. to be 1 wt. %.

Regarding decomposition temperature, the decomposition starting temperature was calculated from differential thermal analyzer data. The result showed the decomposition temperature of the particles to be 250° C.

Change in viscosity with water content was obtained by using an E type viscometer to measure the viscosity of the coating material when the particles were dispersed in the coating material.

Next, the particles were dispersed in a resinous binder to form a coating material and the coating material was applied to a resinous film. More specifically,

| | |
|---|---|
| Polyurethane resin | 20 parts by weight |
| Methyl ethyl ketone | 165 parts by weight |
| Cyclohexanon | 65 parts by weight |
| Toluene | 165 parts by weight |
| Stearic acid | 1 part by weight |
| Acetyl acetone | 1 part by weight | were blended with 100 parts by weight of the particles, dispersion was effected for one hour using a centrifugal ball mill to form a coating material, and the coating material was applied with an applicator to a 10-µm thick base film composed of polyethylene terephthalate to obtain a coating film of the desired thickness of about 3 µm.

The surface smoothness of the non-magnetic layer obtained on the base film was evaluated by measuring its surface roughness Ra. The measurement of the surface roughness of the non-magnetic layer was conducted using a three-dimensional fine shape measuring machine (model ET-30HK) manufactured by Kabushiki Kaisha Kosaka Laboratory. The result showed the surface roughness of the non-magnetic layer to be 108 Å, as shown in Table 2.

The film bearing the non-magnetic layer was slit to obtain an 8-mm wide tape and the strength of the tape was measured. A loop stiffness tester was used for the measurement of tape strength, with an 8-mm wide, 50-mm long tape formed into a loop being evaluated by the force in mg required to impart a displacement of 5 mm under a displacement velocity of approximately 3.5 mm/sec. The result showed the tape strength to be 100 mg, as shown in Table 2.

Working Example 2

Working Example 1 was repeated except that NaAlO$_3$ was added in an amount affording an Al/Fe atomic ratio of 0.040, whereby particles having the property values shown in Table 2 were obtained. The particles occluded 2.5 wt. % of Al and exhibited a decomposition temperature of 260° C., higher than that of the particles of Working Example 1. When a non-magnetic layer was formed using the particles in the same manner as in Working Example 1, its surface roughness was 105 Å and the tape strength was 102 mg.

Working Example 3

Working Example 1 was repeated except that NaAlO$_3$ was added in an amount affording an Al/Fe atomic ratio of 0.080, whereby particles having the property values shown in Table 2 were obtained. The particles occluded 5 wt. % of Al and exhibited a decomposition temperature of 270° C., higher than that of the particles of Working Example 2. When a non-magnetic layer was formed using the particles in the same manner as in Working Example 1, its surface roughness was 100 Å and the tape strength was 107 mg.

Working Examples 4 to 6

Working Example 3 was repeated except that during the blowing of air into the solution, the solution was held at 25° C. (Working Example 4), 35° C. (Working Example 5) or 50° C. (Working Example 6), whereby particles having the property values shown in Table 2 were obtained. These particles were larger in diameter and aspect ratio in the order of Working Examples 4, 5 and 6 and also differed in other properties. When non-magnetic layers were formed using these particles in the same manner as in Working Example 1, their surface roughnesses were 100 Å, 110 Å and 120 Å and the tape strengths were 109 mg, 108 mg and 100 mg.

Working Examples 7 to 9

Working Example 1 was repeated except that the amount of NaAlO$_3$ added was changed in terms of AlFe atomic ratio to 0.016 (Working Example 7), 0.040 (Working Example 8) and 0.080 (Working Example 9) and the times of NaAlO$_3$ addition were all moved to after completion of oxidation. As a result, particles were obtained whose particle surfaces were clad with 1 wt. %, 2.5 wt. % and 5 wt. % of Al. When non-magnetic layers were formed using these particles in the same manner as in Working Example 1, their surface rouglmesses were 125 Å, 120 Å and 115 Å and the tape strengths were 98 mg, 100 mg and 105 mg.

Working Example 10

One liter of an 8 mol/L aqueous solution NaOH was added to 10 liters of an aqueous solution of FeSO$_4$ of a concentration of 0.2 mol/L (mol/liter) and air was blown into the solution for 5 hr while holding it at 30° C. to obtain a suspension containing α-FeOOH precipitate. The suspension was added with an aqueous solution of waterglass in an amount to afford an Si content of 0.5 wt. % relative to the α-FeOOH and the pH was brought below 9. The resulting precipitate was thereafter filtered, washed and dried. The water content was adjusted with steam-containing gas. in the manner of Working Example 1.

The particles obtained contained 0.5 wt. % of Si and had the property values shown in Table 2. When a non-magnetic layer was formed using the particles in the same manner as in Working Example 1, its surface roughness was 120 Å and the tape strength was 99 mg.

Working Example 11

To 10 liters of an aqueous solution of $FeSO_4$ of a concentration of 0.2 moli (molaiter) were added 1 liter of an 8 mol/L aqueous solution NaOH and an amount of $NaAO_3$ affording an Al/Fe atomic ratio of 0.016, whereafter air was blown into the solution for 5 hr while holding it at 30° C. The suspension obtained was added with an aqueous solution of waterglass in an amount to afford an Si content of 0.5 wt. % relative to the α-FeOOH and the pH was brought below 9. The precipitate was thereafter filtered, washed and dried. The water content was adjusted with steam-containing gas in the manner of Working Example 1.

The particles obtained contained 1 wt. % of Al and 0.5 wt. % of Si, and had the property values shown in Table 2. When a non-magnetic layer was formed using the particles in the same manner as in Working Example 1, its surface roughness was 106 Å and the tape strength was 103 mg.

Comparative Example 1

Working Example 1 was repeated except that no $NaAlO_3$ was added, whereby particles having the property values shown in Table 2 were obtained. The particles had a decomposition temperature of 190° C. When a non-magnetic layer was formed using the particles in the same manner as in Working Example 1, its surface roughness was 135 Å and the tape strength was 95 mg.

Comparative Example 2

Working Example 2 was repeated except that the particle cake obtained by the washing and drying was contacted with nitrogen gas not containing steam, whereby particles having the property values shown in Table 2 were obtained. The amount of water released by the particles at 100° C. was 0.05 wt. %. When a non-magnetic layer was formed using the particles in the same manner as in Working Example 1, its surface roughness was 125 Å and the tape strength was 95 mg.

Comparative Example 3

Working Example 2 was repeated except that the particle cake obtained by the washing and drying was contacted with nitrogen gas containing 10 vol. % of steam, whereby particles having the property values shown in Table 2 were obtained. The amount of water released by the particles at 100° C. was 3 wt. %. When a non-magnetic layer was formed using the particles in the same manner as in Working Example 1, its surface roughness was 125 Å and the tape strength was 95 mg.

Control Example 1

Particles of hematite ($Fe_2O_3$) exhibiting the property values shown in Table 2 were procured. When a non-magnetic layer was formed using the particles in the same manner as in Working Example 1, its surface roughness was 154 Å and the tape strength was 90 mg.

Control Example 2

Particles of titanium oxide exhibiting the property values shown in Table 2 were procured. When a non-magnetic layer was formed using the particles in the same manner as in Working Example 1, its surface roughness was 145 Å and the tape strength was 80 mg.

TABLE 2

| Example No. | Particle substance | Al content wt. % | Form of Al inclusion | Si content wt. % | Water content wt. % | Decomposition starting temp. ° C. | Major axis I μm | Minor axis d μm | I/d | BET mg²/g | Dx Å |
|---|---|---|---|---|---|---|---|---|---|---|---|
| Working 1 | FeOOH | 1 | Occluded | 0 | 1 | 250 | 0.15 | 0.023 | 6.5 | 100 | 81 |
| Working 2 | " | 2.5 | Occluded | 0 | 1 | 260 | 0.15 | 0.024 | 6.3 | 108 | 82 |
| Working 3 | " | 5 | Occluded | 0 | 1 | 270 | 0.15 | 0.025 | 6.0 | 118 | 83 |
| Working 4 | " | 5 | Occluded | 0 | 1 |  | 0.10 | 0.023 | 4.3 | 120 | 81 |
| Working 5 | " | 5 | Occluded | 0 | 1 |  | 0.30 | 0.048 | 6.3 | 53 | 103 |
| Working 6 | " | 5 | Occluded | 0 | 1 |  | 0.50 | 0.050 | 10.0 | 40 | 110 |
| Working 7 | " | 1 | Clad | 0 | 1 |  | 0.15 | 0.022 | 6.8 | 96 | 80 |
| Working 8 | " | 2.5 | Clad | 0 | 1 | 235 | 0.15 | 0.022 | 6.8 | 90 | 80 |
| Working 9 | " | 5 | Clad | 0 | 1 |  | 0.15 | 0.022 | 6.8 | 84 | 80 |
| Working 10 | " | 0 | — | 0.5 | 1 |  | 0.15 | 0.022 | 6.8 | 101 | 80 |
| Working 11 | " | 1 | Occluded | 0.5 | 1 |  | 0.15 | 0.023 | 6.5 | 100 | 81 |
| Comparative 1 | " | 0 |  | 0 | 1 | 190 | 0.15 | 0.022 | 6.8 | 101 | 80 |
| Comparative 2 | " | 2.5 | Occluded | 0 | 0.05 |  | 0.10 | 0.024 | 6.3 | 108 | 82 |
| Comparative 3 | " | 2.5 | Occluded | 0 | 3 |  | 0.30 | 0.024 | 6.5 | 108 | 82 |
| Control 1 | $Fe_2O_3$ |  |  | 0 | 1 |  | 0.005* | 0.025 | 6.0 | 55 | 170 |
| Control 2 | $TiO_2$ |  |  | 0 |  |  | 0.035 |  |  | 40 |  |

| Example No. | STA mg/m² | Resin mg/m² | pH | True specific gravity g/cm³ | CD g/cm³ | TAP g/cm³ | Two dimensional skew rate % | Roughness Å | Strength mg |
|---|---|---|---|---|---|---|---|---|---|
| Working 1 | 1.15 | 1.05 | 9 | 4.05 | 1.25 | 0.48 |  | 108 | 100 |
| Working 2 | 1.10 | 1.01 | 9 | 4.02 | 1.26 | 0.47 |  | 105 | 102 |
| Working 3 | 1.04 | 0.94 | 9 | 4.00 | 1.27 | 0.46 | 93 | 100 | 107 |
| Working 4 | 1.01 | 0.91 | 9 | 4.05 | 1.25 | 0.50 |  | 100 | 109 |
| Working 5 | 1.75 | 1.65 | 9 | 3.58 | 1.45 | 0.45 |  | 110 | 108 |
| Working 6 | 1.85 | 1.75 | 9 | 3.55 | 1.50 | 0.40 |  | 120 | 100 |
| Working 7 | 1.18 | 1.08 | 9 | 4.08 | 1.24 | 0.50 |  | 125 | 98 |
| Working 8 | 1.20 | 1.09 | 9 | 4.08 | 1.25 | 0.49 | 87 | 120 | 100 |
| Working 9 | 1.22 | 1.12 | 9 | 4.08 | 1.26 | 0.48 |  | 115 | 105 |
| Working 10 | 0.59 | 0.99 | 9 | 4.08 | 1.23 | 0.52 | 90 | 120 | 99 |
| Working 11 | 0.54 | 0.95 | 9 | 4.09 | 1.25 | 0.48 | 92 | 106 | 103 |
| Comparative 1 | 1.18 | 1.08 | 9 | 4.08 | 1.23 | 0.52 |  | 135 | 95 |

TABLE 2-continued

| | | | | | | | | |
|---|---|---|---|---|---|---|---|---|
| Comparative 2 | 1.11 | 1.02 | 9 | 4.08 | 1.26 | 0.47 | 125 | 95 |
| Comparative 3 | 0.93 | 0.82 | 9 | 4.08 | 1.26 | 0.47 | 125 | 95 |
| Control 1 | 1.61 | 1.61 | 9 | 5.07 | 1.85 | 0.65 | 154 | 90 |
| Control 2 | | | 7 | 4.10 | | | 145 | 80 |

Examples 12 to 38

Similarly as indicated in the foregoing Working Examples, the amount of added $NaAlO_3$, the time of $NaAlO_3$ addition and temperature were varied to variously alter the Al content of the particles, the form of Al inclusion in the particles (by occlusion or cladding) and the shape of the particles (major axis etc.), and the conditions in the final step of water content adjustment by steamcontaining gas were also varied, whereby particles having the various properties shown in Table 3 Examples 12 to 38) were obtained. Non-magnetic layers were formed using the particles in the same manner as in Working Example 1 and the surface roughnesses and tape strengths of the non-magnetic layers obtained were measured in the manner of Working Example 1. The results are shown in Table 3.

Data affixed with the mark * in Table 3 are outside the preferred range of the present invention.

TABLE 3

| Example No. | Particle substance | Al content wt. % | Form of Al inclusion | Water content wt. % | Major axis l $\mu$m | Minor axis d $\mu$m | l/d | BET $mg^2/g$ | Dx Å |
|---|---|---|---|---|---|---|---|---|---|
| 12 | FeOOH | 0.2 | Clad | 1 | 0.15 | 0.022 | 6.8 | 100 | 80 |
| 13 | " | 1 | Clad | 1 | 0.15 | 0.022 | 6.8 | 96 | 80 |
| 14 | " | 2.5 | Clad | 1 | 0.15 | 0.022 | 6.8 | 90 | 80 |
| 15 | " | 5 | Clad | 1 | 0.15 | 0.022 | 6.8 | 84 | 80 |
| 16 | " | 30 | Clad | 1 | 0.15 | 0.022 | 6.8 | 100 | 80 |
| 17 | " | 35* | Clad | 1 | 0.15 | 0.022 | 6.8 | 310 | 80 |
| 18 | " | 1 | Occluded | 1 | 0.15 | 0.023 | 6.5 | 100 | 81 |
| 19 | " | 2.5 | Occluded | 1 | 0.15 | 0.024 | 6.3 | 108 | 82 |
| 20 | " | 5 | Occluded | 1 | 0.15 | 0.025 | 6.0 | 118 | 83 |
| 21 | " | 10 | Occluded | 1 | 0.15 | 0.027 | 5.6 | 135 | 84 |
| 22 | " | 20 | Occluded | 1 | 0.15 | 0.030 | 5.0 | 147 | 85 |
| 23 | " | 35* | Occluded | 1 | 0.15 | 0.032 | 4.7 | 350 | 87 |
| 24 | " | 0 | | 1 | 0.10 | 0.019 | 5.3 | 120 | 75 |
| 24 | " | 0 | | 1 | 0.30 | 0.040 | 7.5 | 55 | 100 |
| 26 | " | 0 | | 1 | 0.005* | 0.003 | 1.7 | 320 | 50 |
| 27 | " | 0 | | 1 | 0.60* | 0.070 | 8.6 | 30 | 110 |
| 28 | " | 5 | Clad | 1 | 0.05 | 0.011 | 4.5 | 190 | 68 |
| 29 | " | 5 | Clad | 1 | 0.10 | 0.019 | 5.3 | 110 | 75 |
| 30 | " | 5 | Clad | 1 | 0.30 | 0.040 | 7.5 | 50 | 100 |
| 31 | " | 5 | Clad | 1 | 0.60* | 0.070 | 8.6 | 25 | 110 |
| 32 | " | 5 | Occluded | 1 | 0.05 | 0.013 | 3.8 | 220 | 70 |
| 33 | " | 5 | Occluded | 1 | 0.10 | 0.023 | 4.3 | 120 | 81 |
| 34 | " | 5 | Occluded | 0.5 | 0.30 | 0.048 | 6.3 | 53 | |
| 35 | " | 5 | Occluded | 1.0 | 0.30 | 0.048 | 6.3 | 53 | 103 |
| 36 | " | 5 | Occluded | 2.0 | 0.30 | 0.048 | 6.3 | 53 | |
| 37 | " | 5 | Occluded | 1 | 0.50 | 0.050 | 10.0 | 40 | 110 |
| 38 | " | 5 | Occluded | 1 | 0.60* | 0.080 | 7.5 | 31 | 112 |

| Example No. | STA mg/m² | Resin mg/m² | pH | True specific gravity g/cm³ | CD g/cm³ | TAP g/cm³ | Viscosity (p) | Roughness Å | Strength mg |
|---|---|---|---|---|---|---|---|---|---|
| 12 | 1.15 | 1.05 | 9 | 4.08 | 1.23 | 0.52 | | 135 | 95 |
| 13 | 1.18 | 1.08 | 9 | 4.08 | 1.24 | 0.5 | | 125 | 98 |
| 14 | 1.20 | 1.09 | 9 | 4.08 | 1.25 | 0.49 | | 120 | 100 |
| 15 | 1.22 | 1.12 | 9 | 4.08 | 1.26 | 0.48 | | 115 | 105 |
| 16 | 1.25 | 1.15 | 9 | 4.08 | 1.26 | 0.47 | | 125 | 100 |
| 17 | 0.32 | 0.35 | 9 | 4.08 | 1.24 | 0.46 | | 180 | 80 |
| 18 | 1.15 | 1.05 | 9 | 4.05 | 1.25 | 0.48 | | 108 | 100 |
| 19 | 1.10 | 1.01 | 9 | 4.02 | 1.26 | 0.47 | | 105 | 102 |
| 20 | 1.04 | 0.94 | 9 | 4.00 | 1.27 | 0.46 | | 100 | 107 |
| 21 | 1.00 | 0.9 | 9 | 3.95 | 1.28 | 0.45 | | 110 | 105 |
| 22 | 0.99 | 0.89 | 9 | 3.90 | 1.29 | 0.44 | | 120 | 104 |
| 23 | 0.51 | 0.41 | 9 | 3.85 | 1.27 | 0.45 | | 155 | 82 |
| 24 | 1.15 | 1.05 | 9 | 4.20 | 1.20 | 0.54 | | 130 | 98 |
| 24 | 1.46 | 1.36 | 9 | 3.60 | 1.40 | 0.46 | | 140 | 98 |
| 26 | 0.66 | 0.30 | 9 | 4.26 | 1.00 | 0.66 | | 180 | 75 |
| 27 | 1.60 | 1.80 | 9 | 3.52 | 1.60 | 0.38 | | 230 | 70 |
| 28 | 0.80 | 0.70 | 9 | 4.25 | 1.10 | 0.54 | | 110 | 105 |
| 29 | 1.08 | 0.98 | 9 | 4.20 | 1.16 | 0.52 | | 110 | 107 |
| 30 | 1.83 | 1.73 | 9 | 3.60 | 1.43 | 0.42 | | 120 | 106 |
| 31 | 2.29 | 2.19 | 9 | 3.52 | 1.60 | 0.36 | | 200 | 95 |

TABLE 3-continued

| | | | | | | | | | |
|---|---|---|---|---|---|---|---|---|---|
| 32 | 0.74 | 0.64 | 9 | 4.23 | 1.18 | 0.55 | | 100 | 107 |
| 33 | 1.01 | 0.91 | 9 | 4.05 | 1.25 | 0.5 | | 100 | 109 |
| 34 | 1.79 | 1.78 | 8 | | | | 80 | 125 | |
| 35 | 1.75 | 1.65 | 9 | 3.58 | 1.45 | 0.45 | 30 | 110 | 108 |
| 36 | 1.71 | 1.48 | 9.5 | | | | 10 | 110 | |
| 37 | 1.85 | 1.75 | 9 | 3.55 | 1.50 | 0.40 | | 120 | 100 |
| 38 | 1.98 | 1.88 | 9 | 3.5 | 1.6 | 0.35 | | 180 | 97 |

As can be seen from the results in Table 2 and Table 3, the particles composed of iron oxyhydroxide according to the present invention can be formed into coating materials with good dispersion in the resinous binder, and when these coating materials are applied to films, they form coating layers with extremely smooth surfaces and, moreover, improve the tape strength. Even when an extremely thin magnetic layer of, say, 0.3 μm or less, is formed on the coating layer, therefore, adequate tape strength can be maintained while securing a magnetic layer with good surface condition and uniform thickness.

We claim:

1. A magnetic recording medium comprising a substrate, a non-magnetic layer comprising acicular iron oxyhydroxide particles and a resinous binder formed on said substrate, and a magnetic layer comprising magnetic particles and resinous binder formed on said non-magnetic layer, said acicular iron oxyhydroxide particles having an average major axis of 0.01 to 0.5 μm and containing not less than 0.1 wt. % and not more than 30 wt. % of Al wherein said acicular iron oxyhydroxide particles release not less than 0.1 wt. % and not more than 2 wt. % of water at 100° C.

2. The medium according to claim 1 wherein said acicular iron oxyhydroxide particles have two or more branches.

3. The medium according to claim 1 wherein said acicular iron oxyhydroxide particles include Al within said particles.

4. A magnetic recording medium comprising a substrate, a non-magnetic layer comprising acicular ion oxyhydroxide particles and a resinous binder formed on said substrate, and a magnetic layer comprising magnetic particles and resinous binder formed on said non-magnetic layer, said acicular iron oxyhydroxide particles having an average major axis of 0.01 to 0.5 μm and containing not less than 0.1 wt. % and not more than 30 wt. % of Si wherein said acicular iron oxyhydroxide particles release not less than 0.1 wt. % and not more than 2 wt. % of water at 100° C.

5. The medium according to claim 4 wherein said acicular iron oxyhydroxide particles have two or more branches.

* * * * *